US012182158B2

(12) United States Patent
Maeomichi et al.

(10) Patent No.: US 12,182,158 B2
(45) Date of Patent: Dec. 31, 2024

(54) INFORMATION PROCESSING APPARATUS, METHOD AND PROGRAM

(71) Applicant: Nippon Telegraph and Telephone Corporation, Tokyo (JP)

(72) Inventors: Hiroyuki Maeomichi, Musashino (JP); Ikuo Yamasaki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/772,576

(22) PCT Filed: Nov. 5, 2019

(86) PCT No.: PCT/JP2019/043241
§ 371 (c)(1),
(2) Date: Apr. 28, 2022

(87) PCT Pub. No.: WO2021/090356
PCT Pub. Date: May 14, 2021

(65) Prior Publication Data
US 2023/0033592 A1    Feb. 2, 2023

(51) Int. Cl.
*G06F 16/00*     (2019.01)
*G06F 9/50*      (2006.01)
(Continued)

(52) U.S. Cl.
CPC .......... *G06F 16/258* (2019.01); *G06F 9/5022* (2013.01); *G06F 16/211* (2019.01)

(58) Field of Classification Search
None
See application file for complete search history.

(56) References Cited

U.S. PATENT DOCUMENTS 8,634,314 B2 *  1/2014  Banka ................... H04L 67/125
                                                      370/252
10,127,242 B1 * 11/2018  Chatterjee ........... G06F 16/1752
(Continued)

FOREIGN PATENT DOCUMENTS

JP      2019-191894      10/2019
WO   WO 2011/142026      11/2011

OTHER PUBLICATIONS

[No Author Listed] [online], "OneM2M Technical Specification TS-0001 2.18.1," onem2m.org, Mar. 12, 2018, retrieved from URL <https://www.onem2m.org/images/files/deliverables/Release2A/TS-0001-Functional_Architecture-v_2_18_1.pdf>, 436 pages.
(Continued)

*Primary Examiner* — Farhan M Syed
(74) *Attorney, Agent, or Firm* — Fish & Richardson P.C.

(57) ABSTRACT

According to one embodiment, there is provided an information processing apparatus of a data processing system in which one or more application programs and a plurality of sensor devices are connected to a database via a network, where the information processing apparatus includes: a request receiving unit configured to receive requests from the application programs or data from the sensor devices via the network; a resource processing unit configured to process the data; and a perpetuation function unit configured to perform a conversion appropriate to a resource on the data processed by the resource processing unit and stores the data in an appropriate schema in the database. The resource processing unit includes a resource management unit provided with a memory and configured to manage attribute information about the resource in the memory.

8 Claims, 10 Drawing Sheets

(51) Int. Cl.
*G06F 16/21* (2019.01)
*G06F 16/25* (2019.01)

(56) References Cited

U.S. PATENT DOCUMENTS

| | | | |
|---|---|---|---|
| 11,563,810 B2* | 1/2023 | Yamato | G08C 15/00 |
| 11,803,524 B1* | 10/2023 | Dwarakanath | G06F 16/2448 |
| 2013/0103657 A1 | 4/2013 | Ikawa et al. | |
| 2014/0080528 A1* | 3/2014 | Lim | H04L 67/12 |
| | | | 455/500 |
| 2016/0188181 A1* | 6/2016 | Smith | G06F 3/04886 |
| | | | 715/765 |
| 2017/0068249 A1* | 3/2017 | Minowa | G05D 1/0291 |
| 2019/0132709 A1* | 5/2019 | Graefe | G08G 1/0133 |
| 2019/0222652 A1* | 7/2019 | Graefe | H04L 67/12 |
| 2020/0059776 A1* | 2/2020 | Martin | H04M 1/72439 |
| 2021/0120307 A1* | 4/2021 | Bastable | H04N 21/4408 |
| 2023/0186201 A1* | 6/2023 | Cella | G05B 19/41885 |
| | | | 705/7.17 |
| 2023/0196230 A1* | 6/2023 | Cella | G06V 10/82 |
| | | | 705/7.17 |

OTHER PUBLICATIONS

[No Author Listed] [online], "OneM2M Technical Specification TS-0004 2.7.1," onem2m.org, Aug. 30, 2016, retrieved from URL <https://www.onem2m.org/technical/partners-releases>, 331 pages.
Harada et al., "Horizontally integrated IoT platform standard Latest trends in oneM2M," NTT Technical Journal, Feb. 2018, pp. 69-72, 10 pages (with English Translation).

* cited by examiner

INFORMATION PROCESSING APPARATUS, METHOD AND PROGRAM

CROSS-REFERENCE TO RELATED APPLICATIONS

This application is a National Stage application under 35 U.S.C. § 371 of International Application No. PCT/JP2019/043241, having an International Filing Date of Nov. 5, 2019, the disclosure of which is considered part of the disclosure of this application, and is incorporated in its entirety into this application.

FIELD

An embodiment of the present invention relates to an information processing apparatus, method and program.

BACKGROUND ART

For the purpose of activating data interchange among different industrial sectors in an IoT/M2M (Internet of Things/Machine to Machine) system, standardization of oneM2M that provides common functions and interfaces has been underway as an international common platform.

The oneM2M common platform prescribes common service functions called CSE (Common Services Entity) and application functions called AE (Application Entity). In M2M, AE operates by connecting to CSE via an interface called mca (Reference Point for M2M Communication with AE). OneM2M stores various IoT data together in CSE, and when an application program (hereinafter also referred to as an application) or a sensor device inputs or outputs data to/from a resource, a resource processing unit of CSE checks attribute information mapped to columns or the like of a database and performs data processing based on identification of the resource to be accessed and on data management conditions.

CITATION LIST

Non-Patent Literature

[Non-Patent Literature 1] oneM2M specifications TS-0001 2.18.1, http://www.onem2m.org/technical/partner-transpositions
[Non-Patent Literature 2] oneM2M specifications TS-0004 2.7.1, http://www.onem2m.org/technical/partner-transpositions
[Non-Patent Literature 3] Standardization Trends of oneM2M for Horizontal Internet of Things Platform, NTT Technical Journal, February 2018, p69-p72, http://www.ntt.co.jp/journal/1802/files/JN20180269.pdf

SUMMARY

Technical Problem

However, a system in which data processing is performed in this way by accessing a database each time data is processed has a problem in that with increases in handled resource, usage of a processor such as a CPU (Central Processing Unit) and frequency of database access in storing and retrieving data increase in an information processing apparatus implementing CSE, resulting in delayed response and reduced throughput.

The present invention is intended to provide a technique for performing data processing with high speed by saving resources in an information processing apparatus of a data processing system such as a oneM2M system or a similar IoT system.

Solution to Problem

To solve the above problem, according to one aspect of the present invention, there is provided an information processing apparatus of a data processing system in which one or more application programs and plural sensor devices are connected to a database via a network, the information processing apparatus comprising: a request receiving unit configured to receive requests from the application programs or data from the sensor devices via the network; a resource processing unit configured to process the data; and a perpetuation function unit configured to perform a conversion appropriate to a resource on the data processed by the resource processing unit and stores the data in an appropriate schema in the database, wherein the resource processing unit includes a resource management unit provided with a memory and configured to manage attribute information about the resource in the memory.

Effects of the Invention

According to the aspect of the present invention, since the resource processing unit can process data by checking the attribute information about the resource managed by the resource management unit of the resource processing unit in the memory, database access frequency is reduced, making it possible to reduce computational resources of the system and thereby reduce response time in data processing. This makes it possible to provide a technique for performing data processing with high speed by saving resources, in an information processing apparatus connected with plural sensor devices or one or more application programs via a network.

DETAILED DESCRIPTION

An embodiment of the present invention will be described below with reference to the accompanying drawings.

Figure 1:
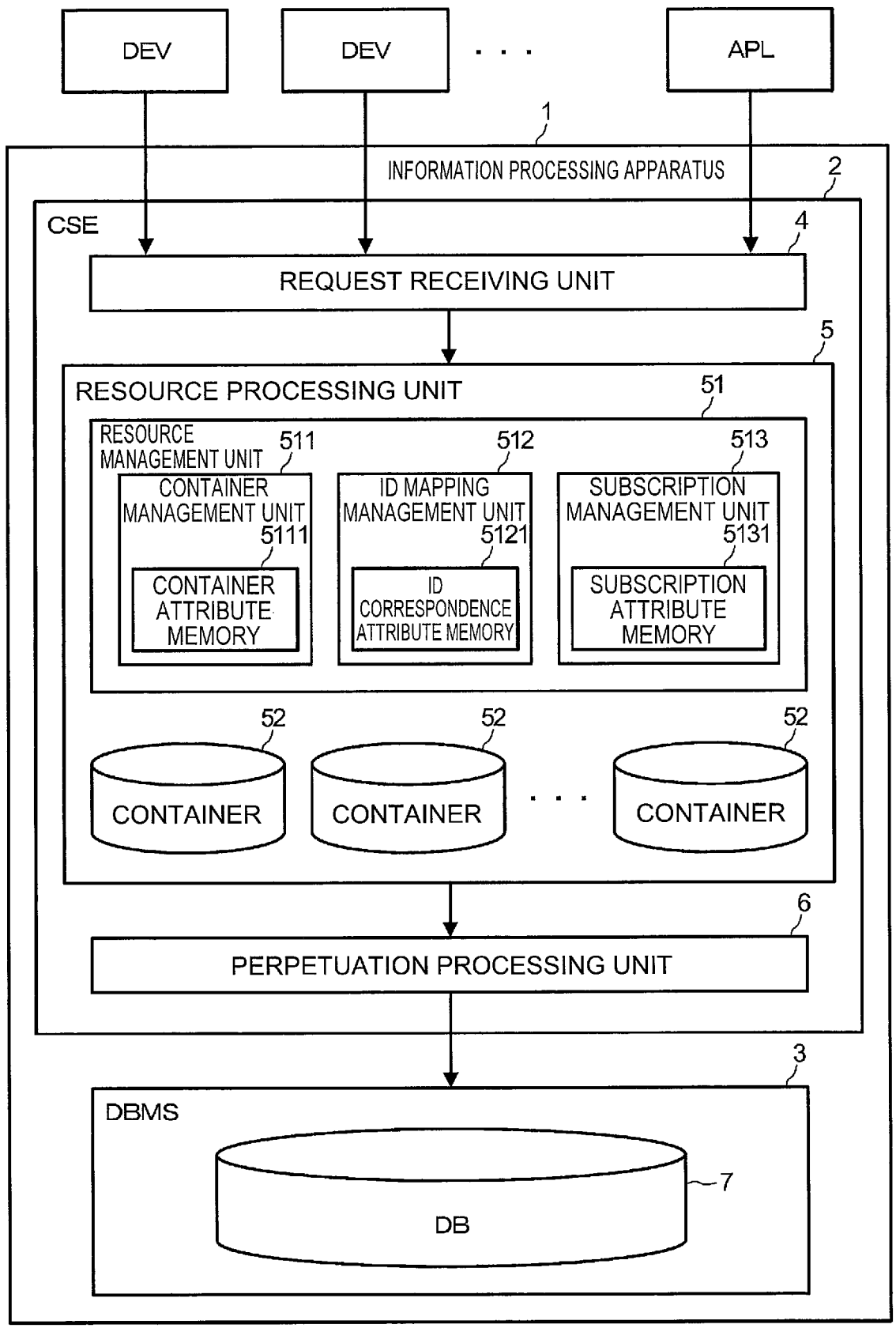
FIG. 1 is a block diagram showing an exemplary software configuration of an oneM2M system including an information processing apparatus according to an embodiment of the present invention.
Figure 2:
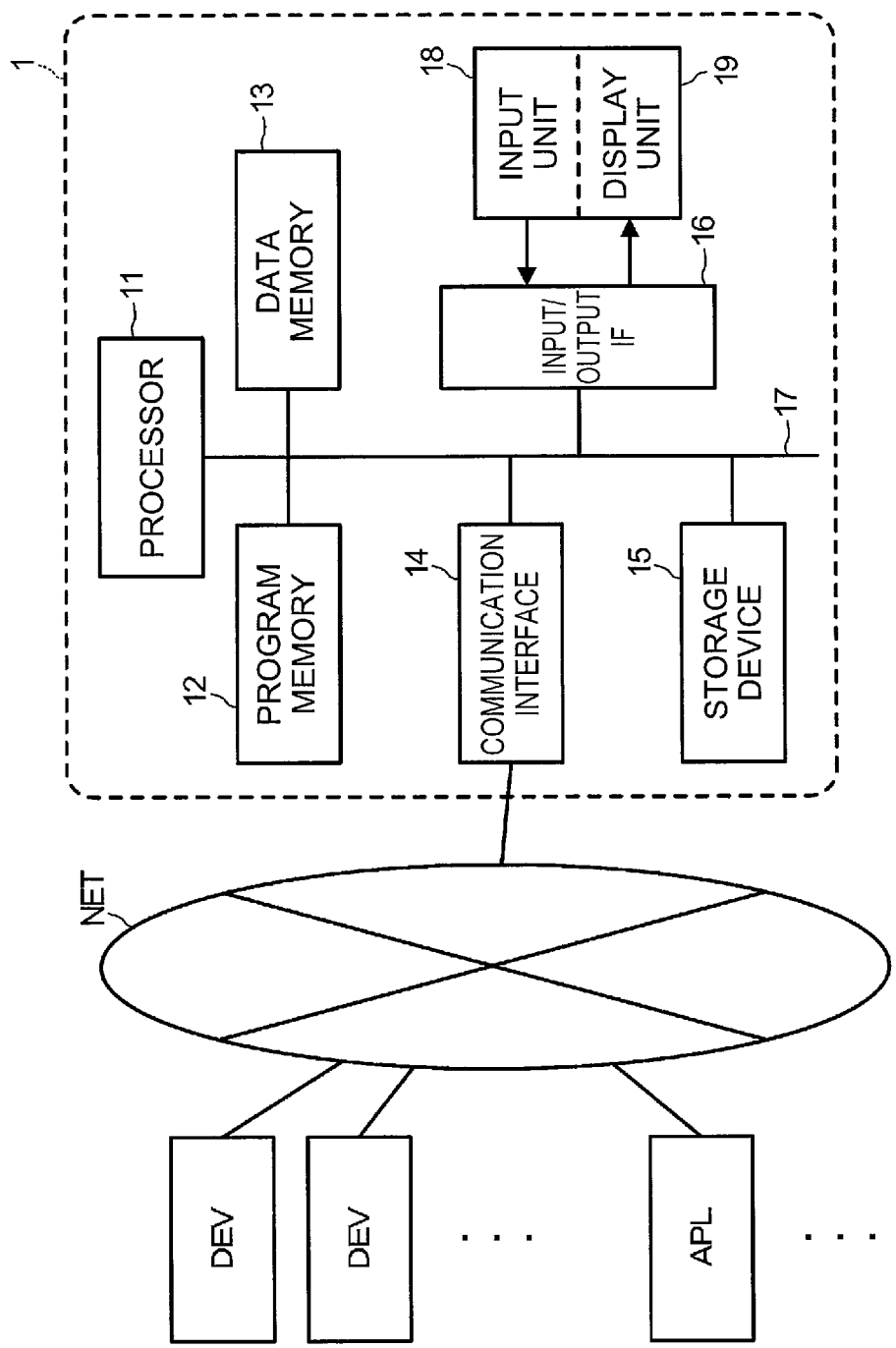
FIG. 2 is a block diagram showing an exemplary hardware configuration of the information processing apparatus.

FIG. 1 is a block diagram showing an exemplary software configuration of an oneM2M system including an information processing apparatus 1 according to an embodiment of the present invention and FIG. 2 is a block diagram showing an exemplary hardware configuration of the information processing apparatus 1.

First, a hardware configuration will be described.

As shown in FIG. 2, the information processing apparatus 1 is made up, for example, of a computer device such as a server computer or a personal computer, and includes a processor 11 such as a CPU. In the information processing apparatus 1, a program memory 12, a data memory 13, a communication interface 14, a storage device 15, and an input/output interface (referred to as an input/output IF in FIG. 2) 16 are connected to the processor 11 via a bus 17.

The communication interface 14 can include, for example, one or more wired or wireless communication modules. The communication interface 14 communicates with plural sensor devices DEV and one or more application programs APL via a network NET. Using the communication interface 14, the information processing apparatus 1 can receive requests from the application programs APL or data from the sensor devices DEV.

The input/output interface 16 is connected with an input unit 18 and a display unit 19. A so-called tablet input/display device can be used as the input unit 18 and display unit 19, where the tablet input/display device is made up of a display screen of, for example, a liquid crystal or organic EL (Electro Luminescence) display device with an electrostatic or pressure-sensitive input sensor sheet placed thereon. Alternatively, the input unit 18 and the display unit 19 may be made up of independent devices. The input/output interface 16 allows operation information entered via the input unit 18 to be inputted to the processor 11 and allows display information generated by the processor 11 to be displayed on the display unit 19. Note that the input/output interface 16, the input unit 18, and the display unit 19 may be omitted. The operation information to the processor 11 and the display information from the processor 11 are transmitted and received by the communication interface 14 via the network NET, and thus can be inputted via input devices connected to the network NET or displayed on display devices connected to the network NET.

The program memory 12, which is a non-transitory tangible computer-readable storage medium, is made up of a combination of, for example, a nonvolatile memory, such as a flash memory, which can be written to and read from at any time, and a nonvolatile memory such as a ROM (Read Only Memory). Programs needed for the processor 11 in performing various control processes according to the embodiment are stored in the program memory 12.

The data memory 13, which is a tangible computer-readable storage medium, is made up of a combination of, for example, a nonvolatile memory such as described above and a volatile memory such as a RAM (Random Access Memory). The data memory 13 is used to store various data acquired and created in the course of performing various processes.

The storage device 15, which is a non-transitory tangible computer-readable storage medium, includes a large-capacity storage medium using a nonvolatile memory, such as an HDD (Hard Disk Drive) or SSD (Solid State Drive), which can be written to and read from at any time. A database configured to store data from the sensor devices DEV as well as data resulting from processing the data from the sensor devices DEV is constructed in the storage device 15.

Next, software configuration will be described.

As shown in FIG. 1, the information processing apparatus 1 includes a CSE 2 and a DBMS (Data Base Management System) 3 as software-based processing functional units. The CSE 2 includes a request receiving unit 4, a resource processing unit 5, and a perpetuation processing unit 6. Perpetuation is the process of saving data in a location in which data will not be lost after the end of a program. The DBMS 3 includes a database (abbreviated to DB in FIG. 1) 7.

Here, components of the CSE 2—namely, the request receiving unit 4, the resource processing unit 5, and the perpetuation processing unit 6—as well as the DBMS 3 are all implemented by causing the processor 11 to read and execute the programs stored in the program memory 12 while using the data memory 13 as appropriate. Note that all or part of these processing functional units may be implemented in any of various other forms including application specific integrated circuits (ASICs) and field-programmable gate arrays (FPGAs). The database 7 is constructed in the storage device 15. Note that the database 7 may be constructed in an external storage device connected to the network NET in addition to using, or without using, the storage device 15, and may be controlled by the DBMS 3 via the communication interface 14.

The request receiving unit 4 receives data from sensor devices DEV such as data observation devices or receives requests from application programs APL such as statistical applications. Typical applications retrieve data by specifying an URI (Uniform Resource Identifier) of a resource via mca and calculate or otherwise manipulate the data.

Figure 3:
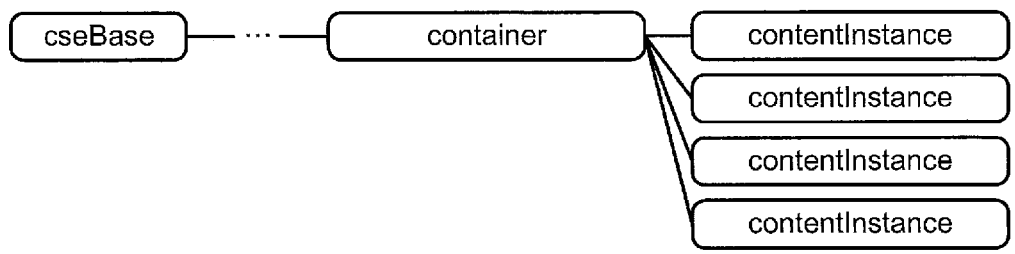
FIG. 3 is a diagram showing an example of a relationship between a <container> resource and <contentInstance> resources.

OneM2M uses a scheme whereby various IoT data is stored together in <ContentInstance> or <TimeSerieseInstance>, which are types of resource in CSE2. <ContentInstance> resources store data by being generated right under a <container> resource acting as a container for use to accumulate data. The <TimeSerieseInstance> resource holds data generation time as an attribute by being generated right under a <timeSeries> resource that detects any loss of time series data. FIG. 3 is a diagram showing an example of a relationship between a <container> resource and <contentInstance> resources. Normally, in a usage example of IoT, a large number of <contentInstance> resources are stored under a <container> resource acting as a data holder. This is also the case with the <timeSeries> resource and <timeSeriesInstance> resources. In a typical oneM2M system, most resources in the system are <contentInstance> resources and <timeSeriesInstance> resources.

The resource processing unit 5 includes a resource management unit 51 configured to manage resource attribute information in the data memory 13 and one or more containers 52 corresponding to the <container> resource. The containers 52 temporarily stores data sent from sensor devices DEV. The containers can be provided in the data memory 13. The resource management unit 51 manages resource attribute information in the data memory 13. Specifically, the resource management unit 51 includes at least one of a container management unit 511, an ID mapping management unit 512, and a subscription management unit 513 and manages the resource attribute information in memory areas located in the data memory 13 and managed by the respective components. The container management unit 511, the ID mapping management unit 512, and the subscription management unit 513 will be described in detail later.

The perpetuation processing unit 6 performs a predetermined process on the data received by the request receiving unit 4 and stored in the containers 52, and passes process results to the DBMS 3. Also, the perpetuation processing unit 6 performs a predetermined process on the data stored in advance in the containers 52, according to the request received by the request receiving unit 4, and passes process results to the DBMS 3. The DBMS 3 permanently stores the data passed from the perpetuation processing unit 6 in the database 7 inside the DBMS 3. That is, the perpetuation processing unit 6 performs a conversion appropriate to a resource on the data processed by the resource processing unit 5 and passes process results to the DBMS 3, making it possible to store the data in an appropriate schema in the database 7.

Next, components of the resource management unit 51 will be described in detail.

(1) Container Management Unit 511

First, the container management unit 511 will be described.

According to oneM2M standard specifications, all attributes of resources are mapped to columns or the like of the database 7 such that reading and writing of resources will be delegated to the database 7. For example, an upper data storage limit on the <container> resource is designed to be able to be determined, allowing attribute values of maxNumberOfInstance, maxByteSize, and maxAge to be set. According to the oneM2M standard specifications, if a maxNumberOfInstance attribute, a maxByteSize attribute, or a maxAge attribute is set for a <container> resource, the resource processing unit 5 checks the maxNumberOfInstance attribute, the maxByteSize attribute, or the maxAge attribute each time a resource is created under the <container> resource and deletes data. By deleting old data according to the number of data items, the total size of data, and the freshness of data indicated by these attribute values, respectively, the resource processing unit 5 performs control such that the data memory 13 making up the containers 52 for use to accumulate data will not suffer any shortage of storage capacity. These specifications present a problem in that low response speed during data accumulation, heavy usage of the processor 11, and high frequency of access to the database 7 will disable the oneM2M system as a whole from delivering performance.

By providing the container management unit 511 having any of the following configurations (1-1)-1 to (1-1)-3 on the resource management unit 51 of the resource processing unit 5, the present embodiment solves inefficiency in relation to the problem of upper limit management frequency.

[Configuration (1-1)-1]

The container management unit 511 permits some excess over a capacity limit, but can have a configuration intended to reduce frequency of attribute checking, to reduce upper limit management frequency, without exceeding the capacity greatly. That is, the container management unit 511 stores a prescribed value used to prescribe timing for checking resource attribute information as attribute information about the <container> resource, in a container attribute memory 5111 provided in a memory area that is located in the data memory 13 and is managed by the container management unit 511. Based on the prescribed value stored in the container attribute memory 5111, the container management unit 511 checks the maxNumberOfInstance attribute, the maxByteSize attribute, or the maxAge attribute of the <container> resource.

For example, the container management unit 511 stores a prescribed number of times n in the container attribute memory 5111. Then, the container management unit 511 checks the maxNumberOfInstance attribute, the maxByteSize attribute, or the maxAge attribute once every n times based on the prescribed number of times n (scheme A). The prescribed number of times n may be, for example, a value such as 100 or 1000 specified beforehand or dynamically. Alternatively, the prescribed number of times n may be calculated dynamically based on an upper limit value of the number of data items indicated by the maxNumberOfInstance attribute. For example, the container management unit 511 can calculate the prescribed number of times n using maxNumberOfInstance/m (where m is 1 to 100, etc.).

Alternatively, the container management unit 511 stores a prescribed duration "duration" in the container attribute memory 5111. Then, based on the prescribed duration "duration," the container management unit 511 checks the maxNumberOfInstance attribute, the maxByteSize attribute, and the maxAge attribute if the attributes have not been checked for the latest duration (scheme B). The prescribed duration "duration" may be, for example, a value such as 100 milliseconds, 1 second or 10 seconds specified beforehand or dynamically, or may be a value calculated dynamically based on an upper limit value of the freshness of data indicated by the maxAge attribute. For example, the container management unit 511 can calculate the prescribed duration "duration" using maxAge*m/100 (where m is 1 to 100, etc.).

Alternatively, the container management unit 511 stores a prescribed size "size" in the container attribute memory 5111. Then, based on the prescribed size "size," the container management unit 511 checks the maxNumberOfInstance attribute, the maxByteSize attribute, and the maxAge attribute upon addition of data corresponding in amount to the size (scheme C). The prescribed size "size" may be, for example, a value such as 1000 or 10000 specified beforehand or dynamically, or may be a value calculated dynamically based on an upper limit value of the total data size indicated by the maxByteSize attribute. For example, the container management unit 511 can calculate the prescribed size "size" using maxByteSize*m/100 (where m is 1 to 100, etc.).

Furthermore, two or more of the schemes A, B, and C above may be combined.

[Configuration (1-1)-2]

The container management unit 511 stores a ring buffer for each <container> resource, as attribute information about the <container> resource, in the container attribute memory 5111 provided in the memory area that is located in the data memory 13 and is managed by the container management unit 511. Then, by referring to the ring buffer stored in the container attribute memory 5111, the container management unit 511 determines any data to be deleted, without searching the database 7.

Figure 4:
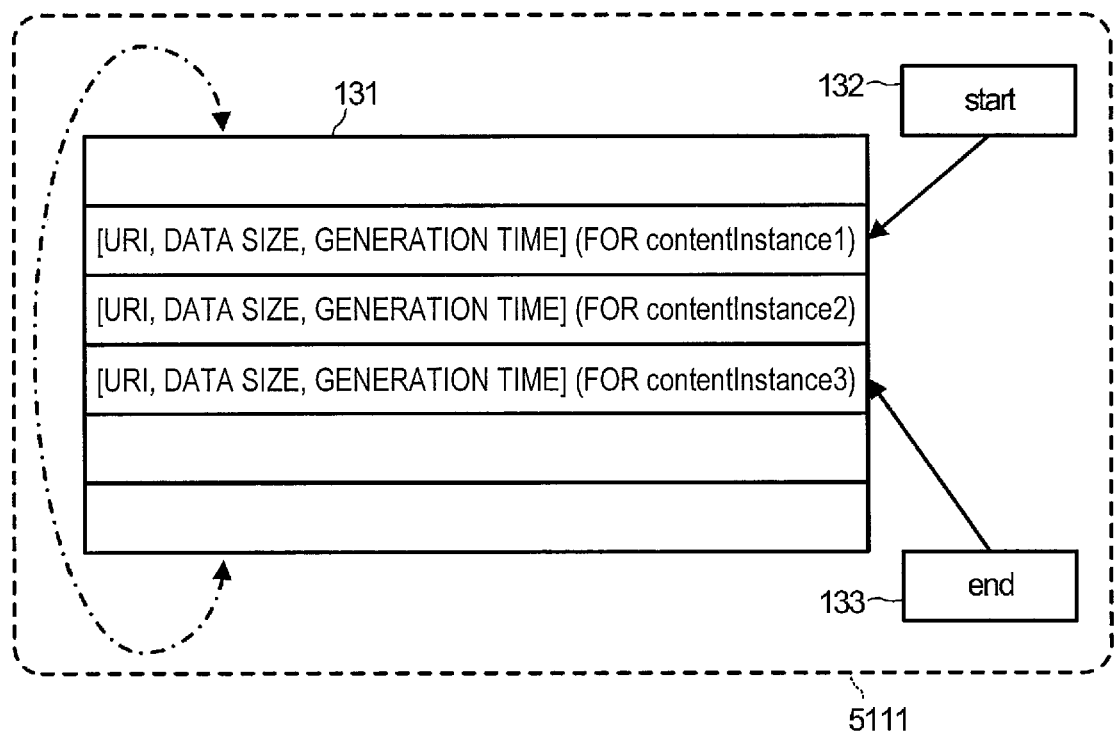
FIG. 4 is a schematic diagram showing an exemplary structure of a ring buffer constructed in a memory of a container management unit.

FIG. 4 is a schematic diagram showing an exemplary structure of a ring buffer 131 for one <container> resource stored in the container attribute memory 5111. The ring buffer 131 includes as many memory areas as specified by the maxNumberOfInstance attribute of the <container> resource. As indicated by a single-pointed line two-headed arrow in FIG. 4, it is assumed that a top side memory area and bottom side memory area of the ring buffer 131 are located next to each other. Each memory area stores pieces of information about respective <contentInstance> resources as a tuple. That is, each memory area stores the URI, data size, and generation time of corresponding <contentInstance> as a tuple. The container management unit 511 stores an effective data range of the ring buffer 131, as starting memory area information "start" and ending memory area information "end," in a starting memory 132 and ending memory 133 provided in the container attribute memory 5111.

By referring to the ring buffer 131 based on memory contents of the starting memory 132 and ending memory 133, the container management unit 511 can determine any data to be deleted, without searching the database 7, making it possible to improve operating speed.

Although in this way, the ring buffer 131, the starting memory 132, and the ending memory 133 can simply use the container attribute memory 5111 provided in the memory areas located in the data memory 13 and managed by the container management unit 511, this is not restrictive.

When data is added or deleted, the ring buffer 131, the starting memory 132, and the ending memory 133 are updated.

Figure 5:
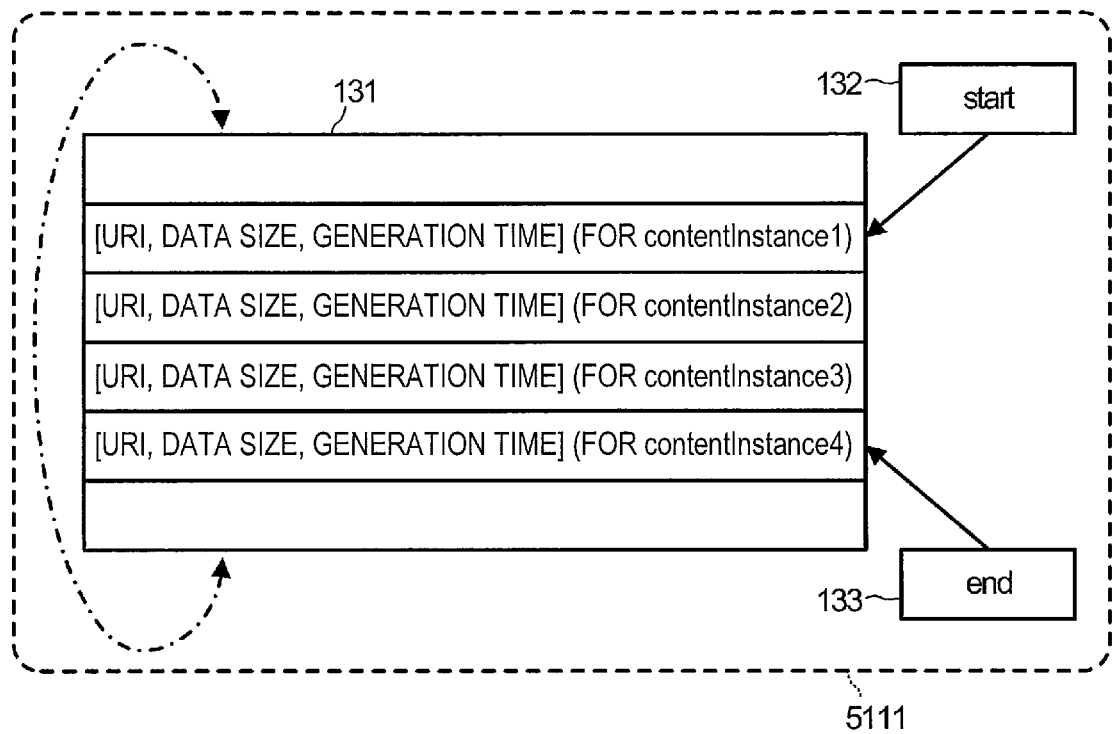
FIG. 5 is a schematic diagram for explaining operation of the container management unit with respect to the ring buffer in adding a <contentInstance> resource.

FIG. 5 is a schematic diagram for explaining operation of the container management unit 511 with respect to the ring buffer 131, the starting memory 132, and the ending memory 133 in adding a <contentInstance> resource. As shown in FIG. 5, when a <contentInstance> resource (e.g., contentInstance4) is newly given by the request receiving unit 4, the container management unit 511 stores the URI, data size, and generation time of the new <contentInstance> resource as a tuple in a memory area next to the latest occupied memory area of the ring buffer 131 indicated by the ending memory area information "end" stored in the ending memory 133. Then, the container management unit 511 updates the ending memory area information "end" in the ending memory 133 so as to indicate the relevant memory area.

Figure 6:
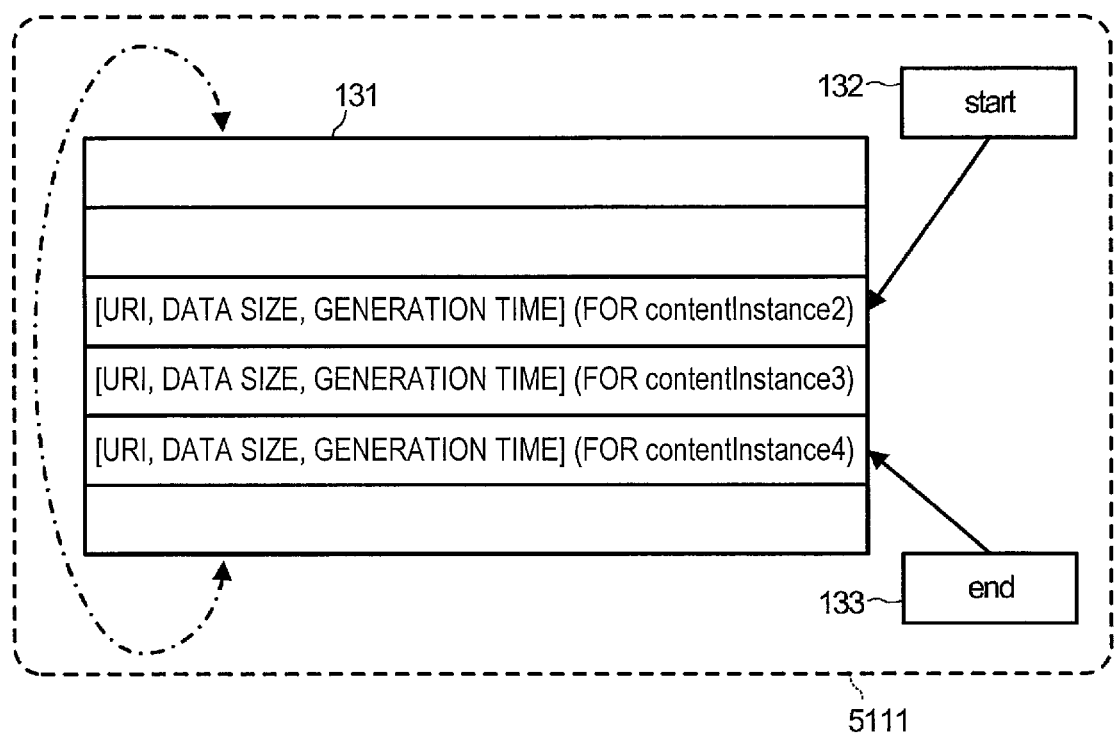
FIG. 6 is a schematic diagram for explaining operation of the container management unit with respect to the ring buffer in deleting a <contentInstance> resource.

When deleting data from any of the containers 52, the container management unit 511 updates the ring buffer 131. FIG. 6 is a schematic diagram for explaining operation of the container management unit 511 with respect to the ring buffer 131 in deleting the oldest <contentInstance> resource (e.g., <contentInstance1>). As shown in FIG. 6, the container management unit 511 deletes information stored in the oldest occupied memory area of the ring buffer 131, the oldest occupied memory area being indicated by the starting memory area information "start" stored in the starting memory 132, and updates the starting memory area information "start" in the starting memory 132 so as to indicate the location (address) of the deleted memory area.

For each of the containers 52 in the resource processing unit 5, the container management unit 511 holds the number of data items N as well as total data size "total" of data under the container 52 in the container attribute memory 5111. Then when data is added, if as a result of the addition, the total data size "total" exceeds the upper limit value of the total data size, the upper limit being indicated by the maxByteSize attribute of the containers 52 of the <contentInstance> resources, the container management unit 511 performs the following operation.

Step ST1: The container management unit 511 creates an empty list as a delete list DeletingList and creates a value of 0 with the long data type as supersession data size DeletingTotal in the container attribute memory 5111.

Step ST2: The container management unit 511 acquires a tuple stored in the memory area at the location (address) of the ring buffer 131 indicated by the starting memory area information "start" stored in the starting memory 132 corresponding to the target container 52. Then, the container management unit 511 adds the URI in the acquired tuple to the delete list DeleteList and adds the data size in the acquired tuple to the supersession data size DeletingTotal. Subsequently, the container management unit 511 advances the starting memory area information "start" stored in the starting memory 132 corresponding to the target container 52 to the location (address) of the next memory area.

Step ST3: Here, if the relationship among the total data size "total," the supersession data size DeletingTotal, and the upper limit value of the total data size indicated by the maxByteSize attribute satisfies total−DeletingTotal>maxByteSize of container 52, the container management unit 511 returns to Step ST2. Otherwise, the container management unit 511 goes to Step ST4 next.

Step ST4: The container management unit 511 deletes the resource corresponding to the URI contained in the delete list DeletingList from the containers 52. Besides, the container management unit 511 stores a difference between the total data size "total" and the supersession data size DeletingTotal in the upper limit value of the total data size indicated by the maxByteSize attribute of the containers 52.

[Configuration (1-1)-3]

The container management unit 511 can be configured to perform chunk management.

In the above configuration (1-1)-2, the container attribute memory 5111 provided in the data memory 13 requires memory capacity proportional to the number of <contentInstance> resources. In configuration (1-1)-3, the container management unit 511 is configured to divide plural <contentInstance> resources under the <container> resource into predetermined groups (referred to as chunks), manage attribute information about the <container> resource on a chunk by chunk basis as a list in the container attribute memory 5111, and delete <contentInstance> resources on a chunk by chunk basis.

Figure 7:
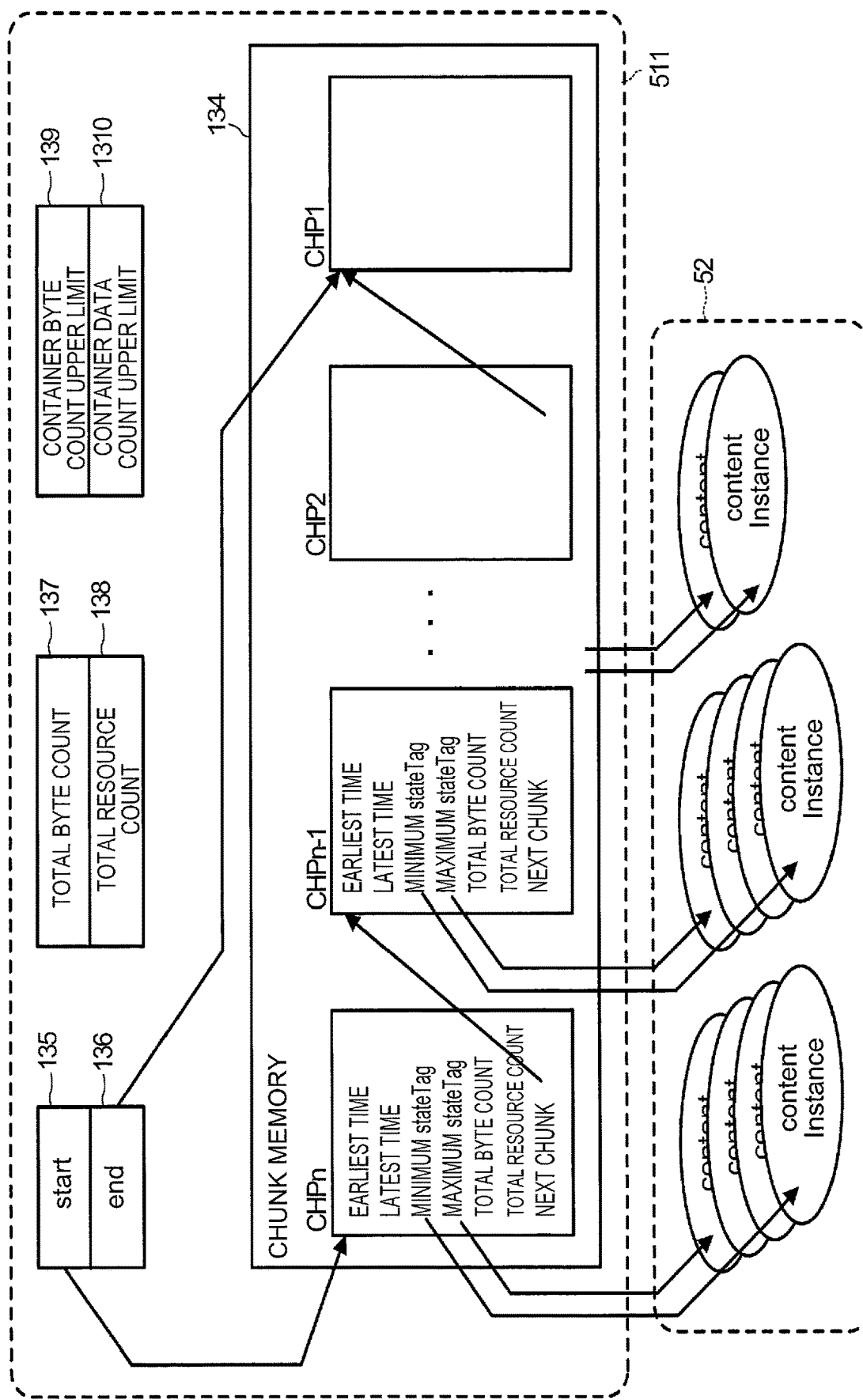
FIG. 7 is a schematic diagram showing an exemplary memory structure of a chunk memory constructed in the memory of the container management unit.

FIG. 7 is a schematic diagram showing an exemplary memory structure of a chunk memory 134 for one <container> resource, where the chunk memory 134 is constructed in the container attribute memory 5111. Each chunk includes an Earliest Time field, a Latest Time field, a Minimum stateTag field, a Maximum stateTag field, a Total Byte Count field, a Total Resource Count field, and a Next Chunk field. The Next Chunk field contains data that indicates the next chunk, and consequently chunks from a chunk CHPn to a chunk CHP1, i.e., from the latest chunk to the oldest chunk, are chained together as a list. Data in the Minimum stateTag field and Maximum stateTag field indicates a related <contentInstance> resource. The Earliest Time field and the Latest Time field contains appropriate time data among times concerning each <contentInstance> resource. The Total Byte Count field contains the data size value of all the <contentInstance> resources of the given chunk and the Total Resource Count field contains the total number of the <contentInstance> resources in the given chunk.

The container attribute memory 5111 further includes a starting memory 135, an ending memory 136, a total byte count memory 137, a total resource count memory 138, a container byte count upper limit memory 139, and a container data count upper limit memory 1310. The starting memory 135 stores the starting memory area information "start" that indicates the location (address) of the latest chunk CHPn stored in the chunk memory 134 and the ending memory 136 similarly stores the ending memory area information "end" that indicates the location (address) of the oldest chunk CHP1. The ending memory area information "end" may be the starting address or ending address of the oldest chunk CHP1. The total byte count memory 137 stores the data size (total byte count) of the <container> resource and the total resource count memory 138 stores the number of <contentInstance> resources under the <container> resource. The container byte count upper limit memory 139 stores the upper limit value of the total data size indicated by the maxByteSize attribute and the container data count upper limit memory 1310 stores the upper limit value of the number of data items indicated by the maxNumberOfInstance attribute.

In this way, by managing attribute information, including the total byte count, total number, and date and time of creation, about the <contentInstance> resources under the <container> resource on a chunk by chunk basis, the container management unit 511 can manage the container 52 with less usage of the container attribute memory 5111 and with less access to the database 7.

Note that although in this way, the chunk memory 134, the starting memory 135, the ending memory 136, the total byte count memory 137, the total resource count memory 138, the container byte count upper limit memory 139, and the container data count upper limit memory 1310 can simply be stored, in the container attribute memory 5111 provided in the data memory 13 and managed by the container management unit 511, this is not restrictive.

Figure 8:
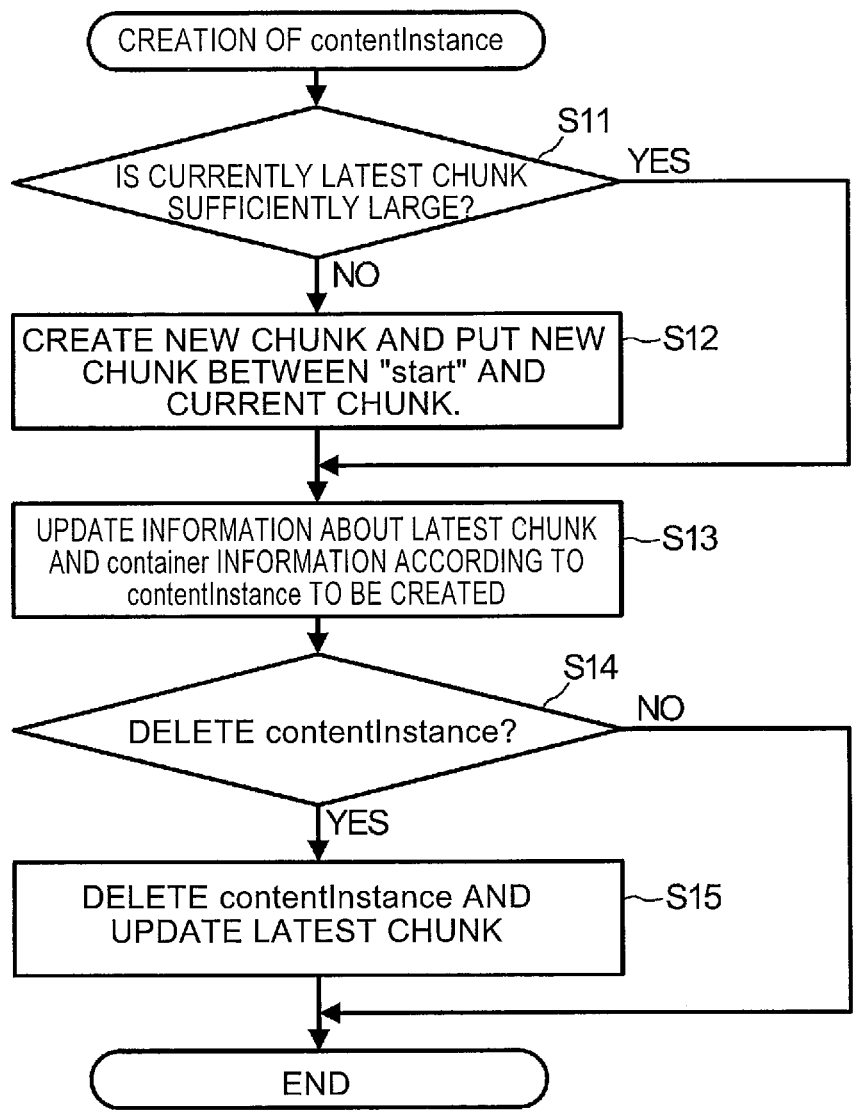
FIG. 8 is a flowchart showing an exemplary processing operation of the container management unit in creating a <contentInstance> resource.

FIG. 8 is a flowchart showing an exemplary processing operation of the container management unit 511 in creating a <contentInstance> resource for a container 52. When a <contentInstance> resource is given via the request receiving unit 4, the container management unit 511 stores the <contentInstance> resource in an appropriate container 52. Then, in Step S11, the container management unit 511 determines whether the currently latest chunk in the appropriate chunk memory 134 is sufficiently large. For that, by setting thresholds for quantities managed by the container 52, such as a difference in generation time, the number of items, or the number of bytes, the determination can be made based on whether or not any of the thresholds has been exceeded. Alternatively, the container management unit 511 may be set to make the determination based on whether or not the thresholds for all the quantities have been exceeded. Whether the quantities are to be managed by the container 52 can be determined based on an attribute of the container 52. That is, when the attribute value is not Unlimited, the quantities are managed by the container 52. Typically, thresholds are set to values 1% to 10% the respective upper limits of the containers 52. The ratios may be determined separately depending on the data to be stored or characteristics of storage limits.

When it is determined that the currently latest chunk is not sufficiently large, the container management unit 511 goes to Step S12, and when it is determined that the currently latest chunk is sufficiently large, the container management unit 511 skips Step S12 and goes to Step S13.

In Step S12, the container management unit 511 creates a new chunk in the chunk memory 134. Then, the container management unit 511 stores the location (address) of the current chunk in the Next Chunk field of the new chunk and updates the starting memory area information "start" in the starting memory 132. Thereby, the container management unit 511 puts the created new chunk between the starting memory area information "start" and the current chunk.

In Step S13, the container management unit 511 updates information about the latest chunk as well as container information according to the <contentInstance> resource to be created. The latest chunk is the currently latest chunk if it is determined in Step S11 that the currently latest chunk is sufficiently large, but if a new chunk is created in Step S12, the new chunk becomes the latest chunk. The container information is data stored in the total byte count memory 137 and the total resource count memory 138.

Subsequently, in Step S14, the container management unit 511 determines whether to delete the <contentInstance> resource. The determination is made by comparing data stored in the total byte count memory 137 and the total resource count memory 138 with data stored in the container byte count upper limit memory 139 and the container data count upper limit memory 1310. If it is determined that the <contentInstance> resource is to be deleted, the container management unit 511 goes to Step S15. If it is determined that there is no need to delete the <contentInstance> resource, the container management unit 511 skips Step S15 and finishes the processing operation for creating the <contentInstance> resource.

In Step S15, the container management unit 511 deletes the <contentInstance> resource corresponding to the final chunk from the appropriate container 52, consequently deletes the final chunk of the chunk memory 134, and thereby updates the final chunk of the chunk memory 134. Depending on the number and data size of the <contentInstance> resources to be created, the final chunk may include not only the oldest chunk CHP1, but also one or more newer chunks.

Plural schemes are available for the determination in step S14 and the process of Step S15. One of the schemes involves operating in such a way as not to exceed an upper limit specified for the container 52 although the scheme does not fully comply with oneM2M specifications (deletion scheme 1). Another scheme involves operating in such a way as to leave data up to the upper limit specified for the container 52 although the scheme does not fully comply with the oneM2M specifications (deletion scheme 2). Another scheme fully complies with the oneM2M specifications (deletion scheme 3).

Control over the number of data items vs. time according to schemes 1 to 3 above will be described with reference to FIGS. 9 to 11 by taking the number of data items as a management item.

Figure 9:
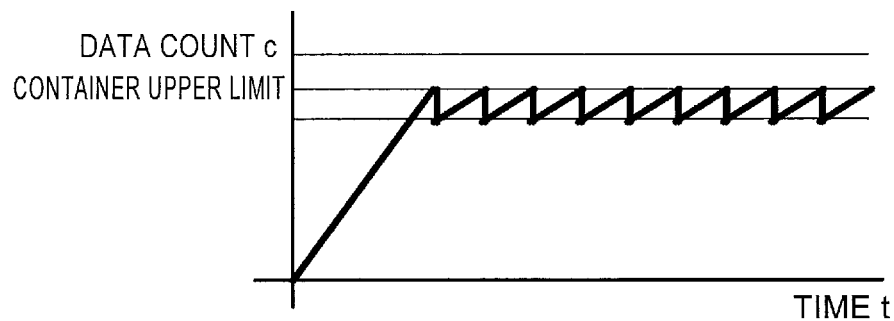
FIG. 9 is a diagram showing an exemplary deletion scheme for a <contentInstance> resource carried out by the container management unit in creating another <contentInstance> resource.

FIG. 9 is a diagram showing a deletion scheme 1 for a <contentInstance> resource carried out by the container management unit 511 in creating another <contentInstance> resource. As shown in FIG. 9, deletion scheme 1 deletes chunks (and deletes data in the container 52 corresponding to the chunks) such that values managed by the container management unit 511 will not exceed the upper limits of the container 52 when the final chunk is deleted. Note that the values managed by the container management unit 511 are the current numbers of bytes and data items of the container 52 stored in the total byte count memory 137 and the total resource count memory 138. The upper limits of the container 52 are the numbers of bytes and data items stored in the container byte count upper limit memory 139 and the container data count upper limit memory 1310.

Figure 10:
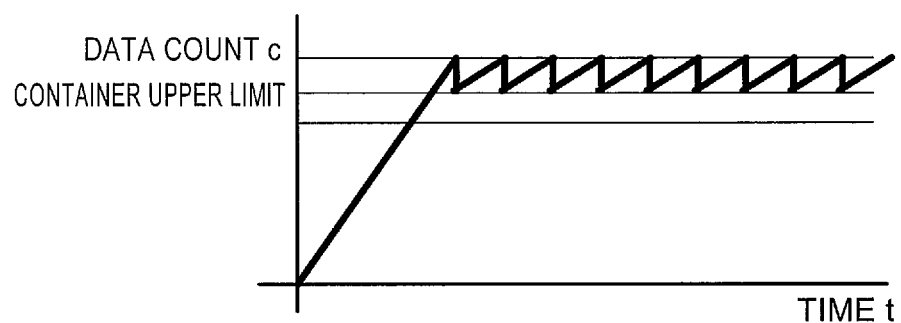
FIG. 10 is a diagram showing another exemplary deletion scheme for a <contentInstance> resource carried out by the container management unit in creating another <contentInstance> resource.

FIG. 10 is a diagram showing a deletion scheme 2 for a <contentInstance> resource carried out by the container management unit 511 in creating another <contentInstance> resource. As shown in FIG. 10, deletion scheme 2 deletes chunks (and deletes data corresponding to the chunks) such that the managed values will not exceed the upper limits of the container 52 when the last chunk is deleted.

Figure 11:
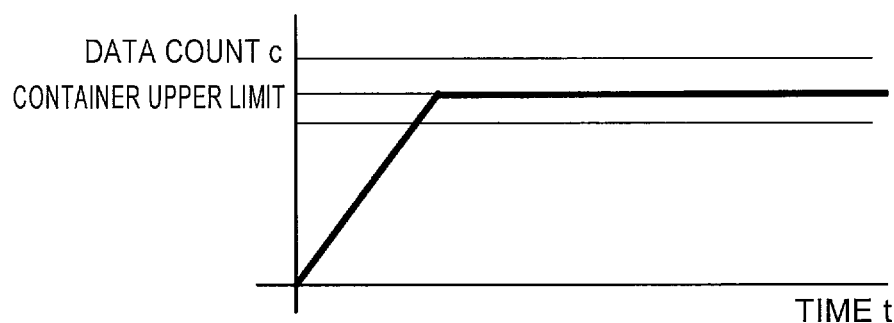
FIG. 11 is a diagram showing still another exemplary deletion scheme for a <contentInstance> resource carried out by the container management unit in creating another <contentInstance> resource.

FIG. 11 is a diagram showing a deletion scheme 3 for a <contentInstance> resource carried out by the container management unit 511 in creating another <contentInstance> resource. As shown in FIG. 11, deletion scheme 3 deletes data by focusing on the final chunk and checking the data in the chunk item-by-item rather than deleting data on a chunk by chunk basis. In this case, the ring buffer 131 shown in the above configuration (1)-1-2 may be generated for the final chunk. By referring to the inside of the ring buffer 131, access frequency to a persistent area such as the database 7 can be reduced.

The <container> resource and the <timeSeries> resource have an attribute that describes statistical information about lower-level resources, and if there is any change in the statistical information about the lower-level resources, the attribute will change as well. For example, when a <contentInstance> resource is newly created, changes occur in currentByteSize, currentNrOfInstances, stateTag, and lastModifiedTime attributes of the higher-level <container> resource as well. Here, the currentByteSize attribute indicates the total number of data bytes of all the <contentInstance> resource under the <container> resource, and the currentNrOfInstances attribute indicates the number of <contentInstance> resources under the <container> resource. The stateTag attribute indicates the number of changes in the <contentInstance> resources under the <container> resource, and the lastModifiedTime attribute indicates an update date/time of the <container> resource. As described above, according to oneM2M standard specifications, all attributes of resources are mapped to columns or the like of the database 7 such that reading and writing of resources will be delegated to the database 7. Therefore, when the attribute that describes statistical information about resources under the <container> resource and <timeSeries> resource is stored in the database 7, the number of accesses to the database 7 increases, resulting in reduced response speed and reduced throughput.

According to the present embodiment, as the container management unit 511 assumes at least one or more of the following configurations (1-2)-1 to (1-2)-3, inefficiency in information management of the <container> resource and <timeSeries> resource can be solved.

[Configuration (1-2)-1]

The container management unit 511 is configured to store the currentByteSize, currentNrOfInstances, stateTag, and lastModifiedTime attributes of the <container> resource and <timeSeries> resource in the container attribute memory 5111 provided in the data memory 13 and managed by the container management unit 511 such that there will be no need to write into a persistent area such as the database 7 each time a change is made. The container management unit 511 is also configured to reconstruct the above attributes from other data on startup of a program that implements CSE2 and store the attributes in the container attribute memory 5111. Specifically, this is implemented as follows.

The container management unit 511 searches a persistent area such as the database 7 and uses the number of <contentInstance> resources under the <container> resource or the number of <timeSeriesInstance> resources under the <timeSeries> resource as the number of currentNrOfInstance attributes.

The container management unit 511 searches a persistent area such as the database 7 and uses the largest stateTag attribute value of the <contentInstance> resources under the <container> resource or the <timeSeriesInstance> resources under the <timeSeries> resource as an attribute value of the stateTag attribute.

The container management unit 511 searches a persistent area such as the database 7 and uses the latest lastModifiedTime attribute value of the <contentInstance> resources under the <container> resource or the <timeSeriesInstance> resources under the <timeSeries> resource as an attribute value of the lastModifiedTime attribute.

[Configuration (1-2)-2]

The container management unit 511 is configured to write attributes held in the container attribute memory 5111 described in configuration (1)-2-1 into a persistent area such as the database 7 with a specific timing.

Specifically, when deleting a <contentInstance> resource under the <container> resource, only when the <contentInstance> resource is the latest, the container management unit 511 writes the state of the <contentInstance> resource managed in a memory area into a persistent area such as the database 7.

Adoption of this method enables the stateTag attribute to be reproduced accurately even if execution of the program that implements CSE2 is terminated abruptly.

With configuration (1-2)-2, the operation of reconstruction from other data at the start of the program differs slightly from the above configuration (1-2)-1 as follows.

The container management unit 511 compares the stateTag attribute of the <container> resource or <timeSeries> resource acquired from a persistent area such as the database 7 with a maximum value of the stateTag attribute of lower-level <contentInstance> resources or <timeSeriesInstance> resources.

If the former is larger, the container management unit 511 adopts the value acquired from the persistent area such as the database 7 as an attribute value of the stateTag attribute and reads the value into the container attribute memory 5111.

On the other hand, if the latter is larger, the same procedures as in configuration (1-2)-1 are used. That is, regarding the attribute value of the currentNrOfInstance attribute, the container management unit 511 searches a persistent area such as the database 7 and uses the number of <contentInstance> resources under the <container> resource or <timeSeriesInstance> resources under the <timeSeries> resource. Regarding the attribute value of the stateTag attribute, the container management unit 511 searches a persistent area such as the database 7 and uses the largest stateTag attribute value of the <contentInstance> resources under the <container> resource or the <timeSeriesInstance> resources under the <timeSeries> resource. Regarding the attribute value of the lastModifiedTime attribute, the container management unit 511 searches a persistent area such as the database 7 and uses the latest lastModifiedTime attribute value of the <contentInstance> resources under the <container> resource or the <timeSeriesInstance> resources under the <timeSeries> resource.

[Configuration (1-2)-3]

The container management unit 511 is configured to write attributes of the <container> resource or <timeSeries> resource held in the container attribute memory 5111 that is provided in the data memory 13 and is managed by the container management unit 511 into a persistent area such as the database 7 either periodically or on occasion of some kind of event.

The term "periodically" means at regular intervals, such as once every minute or once every hour.

The event can be a case in which the remainder left when the total number of requests received by CSE 2 is divided by M is 0. M can be, for example, 100, 1000, or 10000. The event may also be a case in which a load on the processor 11 falls below a predetermined value (e.g., 30%).

(2) ID Mapping Management Unit 512

Next, the ID mapping management unit 512 will be described.

The oneM2M system has to handle both Structured-ID and Unstructured-ID, where the Structured-ID is organized hierarchically and the Unstructured-ID is not organized hierarchically. This also constitutes a limiting factor in increasing the performance of the oneM2M system as a whole.

By providing the ID mapping management unit 512 having any of the following configurations (2)-1 to (2)-2 on the resource management unit 51 of the resource processing unit 5, the present embodiment solves inefficiency in relation to the problem of support for the Structured-ID/Unstructured-ID.

[Configuration (2)-1]

The ID mapping management unit 512 is configured to interconvert Structured-IDs and Unstructured-IDs with reference to an Unstructured-Structured-Map by holding the Unstructured-Structured-Map, which is a table holding correspondence between the Unstructured-IDs not organized hierarchically and the Structured-IDs organized hierarchically, in an ID correspondence attribute memory 5121, which is a memory area located in the data memory 13 and managed by the ID mapping management unit 512. That is, the ID mapping management unit 512 stores attribute information concerning ID mapping in the ID correspondence attribute memory 5121, where the ID mapping indicates the correspondence between the Unstructured-IDs not organized hierarchically and the Structured-IDs organized hierarchically.

In oneM2M, the Structured-ID organized hierarchically is a concatenation of resource names (resourceName's) arranged from upper-level resources to lower-level resources by using a slash (/) as a separator. For example, a Structured-ID looks like "MYCSEBASE/FOO/BAR/CONTAINER1/CIN000."

On the other hand, the Unstructured-ID not organized hierarchically does not have a structure and is issued by CSE2. Although not specifically determined in the oneM2M specifications, the ID may be made up of a Prefix, which is a predetermined character string, and numerical figures, such as uid-0001 or uid-0002.

The Unstructured-Structured-Map, which indicates correspondence between Unstructured-IDs and Structured-IDs, is constructed in the ID correspondence attribute memory 5121. When implemented in the Java (registered trademark) language, the Unstructured-Structured-Map has two java.util.HashMap's, one of which holds Structured-IDs as keys, and Unstructured-IDs as values, while the other holds Unstructured-IDs as keys, and Structured-IDs as values. The Unstructured-Structured-Map can also be implemented using a class such as org.apache.commons.collections4.bidimap.DualTreeBidiMap.

The use of the Unstructured-Structured-Map eliminates the need to inquire of the database 7 about the correspondence between Unstructured-IDs and Structured-IDs, thereby making it possible to reduce the usage of the processor 11 and frequency of access to the database 7 and thus improve the performance of the oneM2M system as a whole.

[Configuration (2)-2]

With the above configuration (2)-1, when the number of resources increases, the Unstructured-Structured-Map becomes large, increasing the memory usage in the ID correspondence attribute memory 5121 of the data memory 13. To solve this, the ID mapping management unit 512 can be configured to generate Unstructured-IDs for specific resources based on a specific generation criterion. That is, the ID mapping management unit 512 is configured to interconvert Structured-IDs and Unstructured-IDs using a procedure paired with any desired generation criterion without storing the resources in the Unstructured-Structured-Map.

As shown in FIG. 3, normally, in a usage example of IoT, a large number of <contentInstance> resources are stored under a <container> resource acting as a data holder. This is also the case with the <timeSeries> resource and <timeSeriesInstance> resources. In a typical oneM2M system, most resources in the system are <contentInstance> resources and <timeSeriesInstance> resources.

In configuration (2)-2, correspondence between Unstructured-IDs and Structured-IDs for these resources can be handled without using the ID correspondence attribute memory 5121.

Specifically, allocations can be made such that a structure made up of {prefix}{Unstructured-ID of parent resource}{delimiter}{resource name of child resource} will be used as the generation criterion described above. For example, a period (.) is used as the prefix and a minus sign (−) is used as the delimiter. Note that restrictions can be imposed on available characters such that characters used for {prefix} and {delimiter} will not be used for normal Unstructured-IDs.

Figure 12:
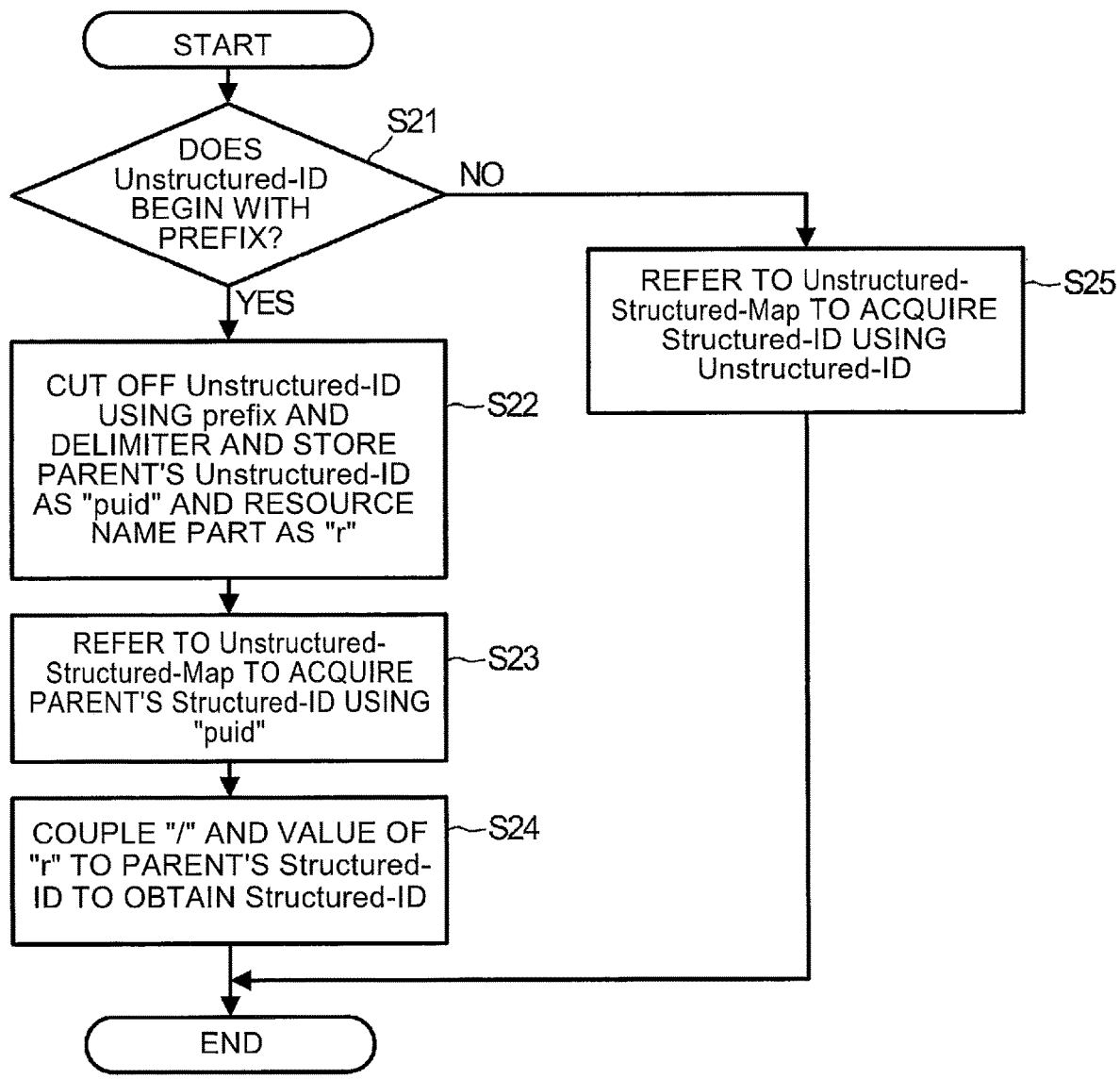
FIG. 12 is a flowchart showing an exemplary processing operation of an ID mapping management unit in finding out a Structured-ID using an Unstructured-ID.

When such allocations are made, a procedure for finding out a Structured-ID using an Unstructured-ID will be described. FIG. 12 is a flowchart showing an exemplary processing operation of an ID mapping management unit 512 in finding out a Structured-ID using an Unstructured-ID.

First, in Step S21, the ID mapping management unit 512 determines whether the Unstructured-ID begins with a prefix. If it is determined that the Unstructured-ID begins with a prefix, the ID mapping management unit 512 goes to Step S22. On the other hand, if it is determined that the Unstructured-ID does not begin with a prefix, the ID mapping management unit 512 goes to Step S25.

In Step S22, the ID mapping management unit 512 cuts off the Unstructured-ID using a prefix and a delimiter.

Then, after the cutting, the ID mapping management unit 512 stores the parent's Unstructured-ID part as a variable "puid", and a resource name part as a variable "r" in a non-illustrated register provided in the ID correspondence attribute memory 5121. Next, in Step S23, the ID mapping management unit 512 refers to the Unstructured-Structured-Map to acquire the parent's Structured-ID using the value of the variable "puid". Then, in Step S24, the ID mapping management unit 512 couples a slash (/) as a separator and the value of the variable "r" to the parent's Structured-ID acquired from the Unstructured-Structured-Map to obtain a Structured-ID. After obtaining the Structured-ID in this way, the ID mapping management unit 512 finishes the processing operation.

In Step S25, the ID mapping management unit 512 refers to the Unstructured-Structured-Map to acquire the Structured-ID using the Unstructured-ID. After obtaining the Structured-ID in this way, the ID mapping management unit 512 finishes the processing operation.

Figure 13:
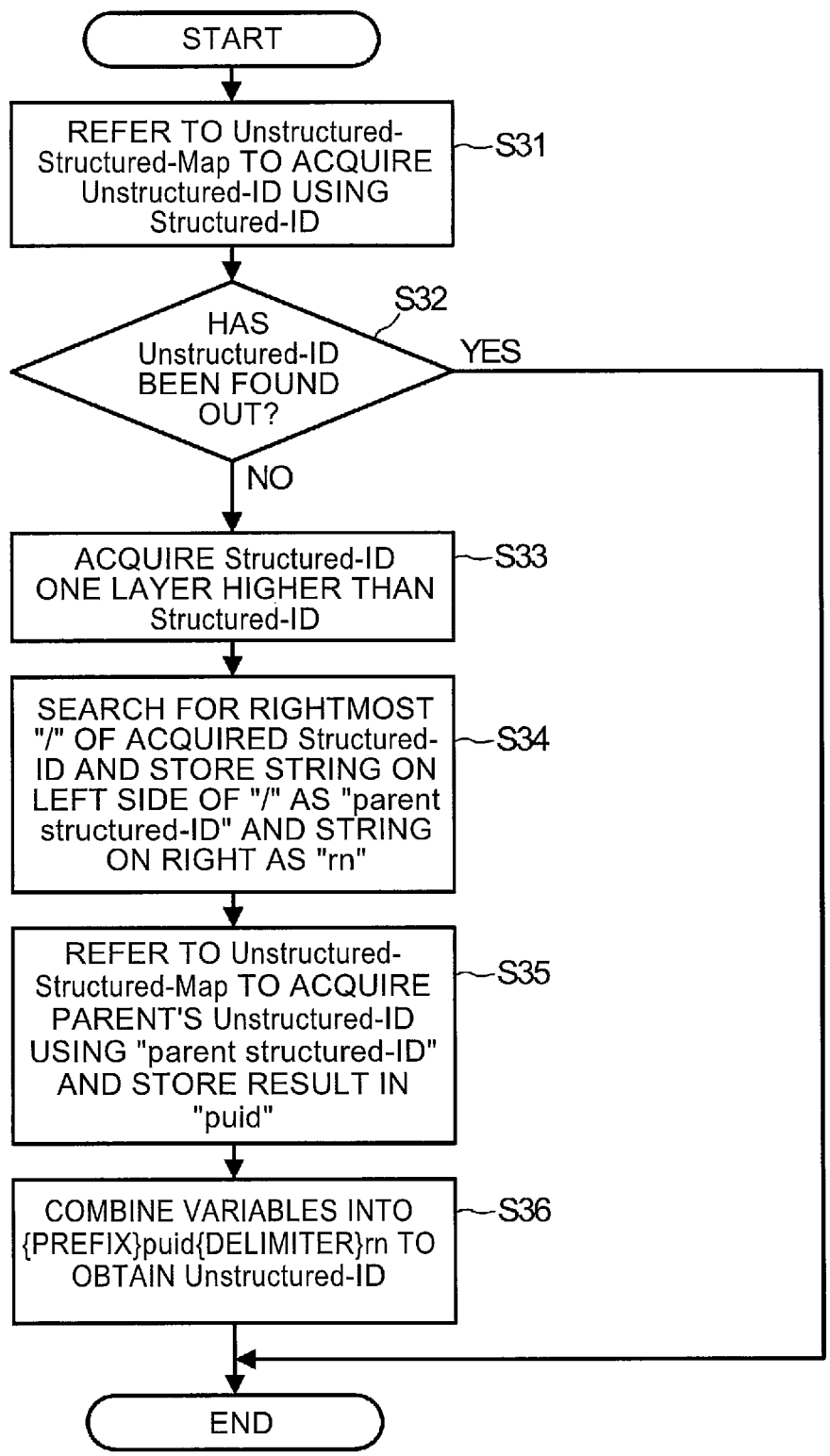
FIG. 13 is a flowchart showing an exemplary processing operation of the ID mapping management unit in finding out an Unstructured-ID using a Structured-ID.

Next, conversely, a procedure for finding out an Unstructured-ID using a Structured-ID will be described. FIG. 13 is a flowchart showing an exemplary processing operation of the ID mapping management unit 512 in finding out an Unstructured-ID using a Structured-ID.

First, in Step S31, the ID mapping management unit 512 refers to the Unstructured-Structured-Map to acquire the Unstructured-ID using the Structured-ID.

Next, in Step S32, the ID mapping management unit 512 determines whether an Unstructured-ID has been found out, i.e., whether an Unstructured-ID has been acquired with reference to the Unstructured-Structured-Map. If it is determined that an Unstructured-ID has been found out, since the Unstructured-ID has been obtained, the ID mapping management unit 512 finishes the processing operation. On the other hand, if it is determined that no Unstructured-ID has been found out, the ID mapping management unit 512 goes to Step S33.

In Step S33, the ID mapping management unit 512 acquires a Structured-ID one layer higher than the Structured-ID. Then, in Step S34, the ID mapping management unit 512 searches for the rightmost slash (/) of the acquired Structured-ID and stores the string on the left side of the slash (/) as a variable "parent structured-ID," and the string on the right as a variable "rn" in a non-illustrated register provided in the ID correspondence attribute memory 5121. Next, in Step S35, the ID mapping management unit 512 refers to the Unstructured-Structured-Map to acquire the parent's Unstructured-ID using the value of the variable "parent structured-ID" and stores the result as a variable "puid" in the non-illustrated register. Then, in Step S36, the ID mapping management unit 512 combines the value of the variable "puid" and value of the variable "rn" stored in the register into {prefix}puid{delimiter}rn to obtain an Unstructured-ID. After obtaining the Unstructured-ID in this way, the ID mapping management unit 512 finishes the processing operation.

Figure 14:
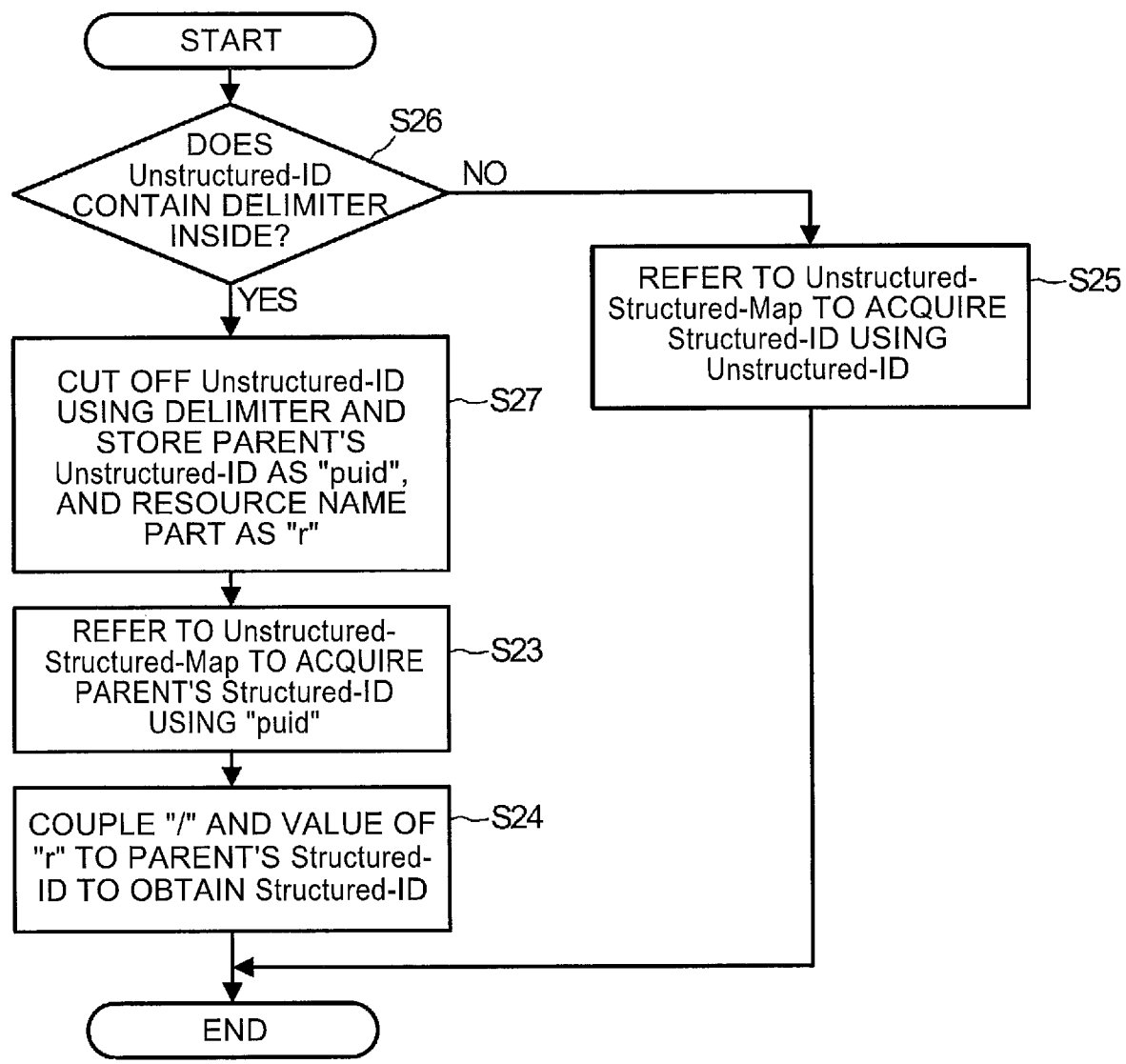
FIG. 14 is a flowchart showing another exemplary processing operation of the ID mapping management unit in finding out a Structured-ID using an Unstructured-ID.

Although in FIGS. 12 and 13, for example, a period (.) is used as a prefix and a minus sign (−) is used as a delimiter, a null character (" ") may be used as the Prefix. In that case, the procedure for finding out a Structured-ID using an Unstructured-ID is as shown in FIG. 14. FIG. 14 is a flowchart showing another exemplary processing operation of the ID mapping management unit 512 in finding out a Structured-ID using an Unstructured-ID. Steps S23 to S25 are as described with reference to FIG. 12.

First, in Step S26, the ID mapping management unit 512 determines whether the Unstructured-ID contains a delimiter inside. If it is determined that the Unstructured-ID contains a delimiter inside, the ID mapping management unit 512 goes to Step S27. On the other hand, if it is determined that the Unstructured-ID does not contain a delimiter inside, the ID mapping management unit 512 goes to Step S25.

In Step S27, the ID mapping management unit 512 cuts off the Unstructured-ID using a delimiter. Then, after the cutting, the ID mapping management unit 512 stores the parent's Unstructured-ID part as a variable "puid", and a resource name part as a variable "r" in a non-illustrated register provided in a memory area located in the data memory 13 and managed by the ID mapping management unit 512. Subsequently, the ID mapping management unit 512 goes to Step S23 and performs a processing operation such as described above.

Because the time taken to scan for the inclusion of a delimiter inside is proportional to the length of the string, the processing procedure shown in FIG. 12 is faster. However, this processing procedure eliminates the need for restrictions on available characters such as described earlier in relation to the prefix. Besides, the number of characters in the Unstructured-ID can be reduced by one character, which also provides an advantage in terms of memory requirements.

Instead of using a delimiter, a method is also available that makes the Unstructured-IDs of normal resources (resources other than <contentInstance> resources and <timeSeriesInstance> resources) fixed in length.

(3) Subscription Management Unit 513

Next, the subscription management unit 513 will be described.

The oneM2M system has a mechanism to give a notice when data is changed. Whether to give a notice is controlled by a resource called <subscription>. By creating the <subscription> resource under a resource to be monitored for any data change, it is possible to indicate that the resource is to be monitored.

Here, with a system that holds a large number of resources, it takes time to search for the <subscription> resource, causing a problem of increased response time.

By providing the subscription management unit 513 having any of the following configurations (3)-1 to (3)-2 on the resource management unit 51 of the resource processing unit 5, the present embodiment solves inefficiency in relation to the <subscription> resource.

[Configuration (3)-1]

The subscription management unit 513 is configured to cache the <subscription> resource itself in a subscription attribute memory 5131, which is a memory area located in the data memory 13 and managed by the subscription management unit 513. That is, the subscription management unit 513 stores attribute information about the <subscription> resource in the subscription attribute memory 5131.

In this case, there is a method that caches the <subscription> resource as an array or a List in the subscription attribute memory 5131. With this method, even if the <subscription> resource is placed in the subscription attribute memory 5131, searches require successive references and it takes time to calculate O(n).

There is also another method that caches the URI of an upper-level resource as a key in a hash table provided in the subscription attribute memory 5131. This makes it possible search for a <subscription> resource under a specific resource at a higher speed.

[Configuration (3)-2]

A resource at a level above a <subscription> resource is provided with a hasSubscription attribute as an internal attribute. The internal attribute as referred to here is transparent to application programs APL, saved in the database 7, and used to control the platform itself. The hasSubscription attribute is of the boolean data type, and is controlled so as to become true if there is a <subscription> resource under the attribute and become false if there is no <subscription> resource under the attribute.

The system is configured such that when a resource is changed, the subscription management unit 513 will search for a <subscription> resource only if the hasSubscription attribute is true. This configuration reduces frequency of searching the database 7, resulting in greater efficiency.

Configuration (3)-2 can be combined with configuration (3)-1 described above. That is, to search for a <subscription> resource, the subscription attribute memory 5131 rather than the database 7 is searched.

In a data processing system, such as a oneM2M system, in which one or more application programs APL and plural sensor devices are connected to a database via a network, the information processing apparatus 1 according to the embodiment described above has the resource management unit 51 in the resource processing unit 5 of the information processing apparatus 1 to manage resource attribute information in the data memory 13. Consequently, upon receiving a request from any of the application programs APL, or data from any of the sensor devices, the information processing apparatus 1 processes data by checking resource attribute information in the data memory 13 using the resource processing unit 5.

As a result, when the resource processing unit 5 processes data in response to the request, the resource management unit 51 of the resource processing unit 5 manages resource attribute information in relation to management of resources such as <container> resources, ID mapping, and <Subscription> resources, as a list and the like in the data memory 13, thereby reducing the frequency of access to the database 7. Thus, the information processing apparatus 1 can reduce computational resources of the system and thereby reduce response time in data processing.

Other Embodiments

Although the above embodiment has been described by focusing on <container> resources and <contentInstance> resources, the present invention is also applicable to <timeSeries> resources and <timeSeriesInstance> resources.

Besides, although the above embodiment has been described by focusing on oneM2M, the present invention is similarly applicable to ETSI (European Telecommunication Standards Institute) M2M and to IoT PF (Platform) of a similar type.

Although concreate numerical values have been shown in the description of the above embodiment, this is exemplary, and the concreate numerical values are not meant to be restrictive.

Although the above embodiment has been described using a specific data structure, needless to say the above embodiment can be expressed by a similar structure.

The techniques described in the above embodiment can be distributed as programs (software means) executable by a computer by being stored in a recording medium or by being transmitted via a communications medium, where examples of the recording medium include magnetic disks (a floppy (registered trademark) disk, a hard disk, and the like), optical disks (a CD-ROM, a DVD, an MO, and the like), semiconductor memories (a ROM, a RAM, a flash memory, and the like). Note that the programs stored in the medium also include a configuration program that configures, in the computer, software means (including not only execution programs, but also tables and data structures) to be executed by the computer. The computer that implements the present apparatus performs the above processes by reading the programs recorded on the recording medium by building software means in some cases using the configuration program, and by allowing the software means to control operation. Note that the recording medium referred to herein is not limited to distribution media, and includes storage media such as magnetic disks and semiconductor memories provided in the computer or devices connected via a network.

In short, the present invention is not limited to the above embodiments, and may be modified in various forms in the implementation stage without departing from the gist of the invention. The embodiments may be implemented in combination as appropriate, offering combined effects. Furthermore, the above embodiments include inventions in various stages, and various inventions can be extracted through appropriate combinations of the disclosed components.

REFERENCE SIGNS LIST

1 Information processing apparatus
2 CSE (Common Services Entity)
3 DBMS (Data Base Management System)
4 Request receiving unit
5 Resource processing unit
6 Perpetuation processing unit
7 Database (DB)
11 Processor
12 Program memory
13 Data memory
14 Communication interface
15 Storage device
16 Input/output interface
17 Bus
18 Input unit
19 Display unit
51 Resource management unit
52 Container
131 Ring buffer
132, 135 Starting memory
133, 136 Ending memory
134 Chunk memory
137 Total byte count memory
138 Total resource count memory
139 Byte count memory
1310 Data count memory
511 Container management unit
5111 Container attribute memory
512 ID mapping management unit
5121 ID correspondence attribute memory
513 Subscription management unit
5131 Subscription attribute memory
APL Application program
CHP1, CHP2, CHPn-1, CHPn Chunk
DEV Sensor device
NET Network

The invention claimed is:

1. An information processing apparatus of a data processing system in which one or more application programs and a plurality of sensor devices are connected to a database via a network, the information processing apparatus comprising:
 a hardware processor; and
 a memory connected to the hardware processor,
 the hardware processor configured to execute:
  receiving one of requests from the application programs and data from the sensor devices via the network;
  managing attribute information about a resource in the memory;
  processing the data received from sensor devices based on the attribute information to obtain processed data;

performing a conversion appropriate to the resource on the processed data to obtain converted data; and storing the converted data in an appropriate schema in the database;

wherein processing the data includes storing the data received from the sensor device together in the resource, and wherein processing the data includes checking the attribute information of the resource when the application program or the sensor device inputs and outputs data to/from the resource, and processing the data based on identification of the resource to be accessed or data management condition;

wherein the attribute information includes any one of:
  (1) information that prescribes timing intended to reduce frequency of attribute checking to permit some excess over a capacity limit of a container for use to accumulate information from at least the sensor device, without excess over the capacity limit greatly; and
  (2) memory area information in a ring buffer corresponding to information from the sensor device.

2. The information processing apparatus according to claim 1, wherein the hardware processor is configured to execute managing attribute information about a <container> resource, as the attribute information about the resource, in the memory.

3. The information processing apparatus according to claim 2, wherein:
  the memory includes a container configured to store the data; and
  when storing new data in the container, based on the attribute information about the <container> resource, the hardware processor is configured to execute managing data already stored in the container, such that an upper storage limit of the container is not exceeded.

4. The information processing apparatus according to claim 2, wherein based on the attribute information about the <container> resource, the hardware processor is configured to execute managing data to be stored in the database.

5. The information processing apparatus according to claim 1, wherein the hardware processor is configured to execute managing attribute information about correspondence between an ID not organized hierarchically and an ID organized hierarchically, as the attribute information about the resource, in the memory.

6. The information processing apparatus according to claim 1, wherein the hardware processor is configured to execute managing attribute information about a <subscription> resource, as the attribute information about the resource, in the memory.

7. An information processing method performed by a processor provided in an information processing apparatus of a data processing system in which one or more application programs and a plurality of sensor devices are connected to a database via a network, the information processing apparatus comprising a hardware processor and a memory connected to the hardware processor, the method comprising:

receiving, by the information processing apparatus, one of requests from the application programs and data from the sensor devices;

managing, by the information processing apparatus, attribute information about a resource in the memory;

processing, by the information processing apparatus, the data received from sensor devices based on the attribute information to obtain processed data;

performing, by the information processing apparatus, a conversion appropriate to the resource on the processed data to obtain converted data; and storing, by the information processing apparatus, the converted data in an appropriate schema in the database;

wherein processing the data includes storing the data received from the sensor device together in the resource, and wherein processing the data includes checking the attribute information of the resource when the application program or the sensor device inputs and outputs data to/from the resource, and processing the data based on identification of the resource to be accessed or data management condition;

wherein the attribute information includes any one of:
  (1) information that prescribes timing intended to reduce frequency of attribute checking to permit some excess over a capacity limit of a container for use to accumulate information from at least the sensor device, without excess over the capacity limit greatly; and
  (2) memory area information in a ring buffer corresponding to information from the sensor device.

8. A non-transitory tangible computer readable storage medium having stored thereon an information processing program for causing a hardware processor to execute:

receiving one of requests from application programs and data from sensor devices;

managing attribute information about a resource in a memory;

processing the data received from sensor devices based on the attribute information to obtain processed data;

performing a conversion appropriate to the resource on the processed data to obtain converted data; and storing the converted data in an appropriate schema in a database;

wherein processing the data includes storing the data received from the sensor device together in the resource, and wherein processing the data includes checking the attribute information of the resource when the application program or the sensor device inputs and outputs data to/from the resource, and processing the data based on identification of the resource to be accessed or data management condition;

wherein the attribute information includes any one of:
  (1) information that prescribes timing intended to reduce frequency of attribute checking to permit some excess over a capacity limit of a container for use to accumulate information from at least the sensor device, without excess over the capacity limit greatly; and
  (2) memory area information in a ring buffer corresponding to information from the sensor device.

* * * * *